United States Patent [19]

Wiley

[11] 4,128,688
[45] Dec. 5, 1978

[54] RESINOUS MOISTURE RESISTANT LAMINATE

[75] Inventor: John W. Wiley, Woodstown, N.J.

[73] Assignee: Mannington Mills, Inc., Salem, N.J.

[21] Appl. No.: 750,570

[22] Filed: Dec. 14, 1976

[51] Int. Cl.$^2$ .............................................. B32B 3/26
[52] U.S. Cl. .................................... 428/311; 428/159;
428/315; 428/317; 428/321; 428/907
[58] Field of Search ................................ 428/44, 46–48,
428/54–56, 158, 159, 160, 310, 311, 315, 317,
320, 321, 907

[56] References Cited

U.S. PATENT DOCUMENTS

| 3,408,248 | 10/1968 | Maass | 428/159 |
|---|---|---|---|
| 3,578,548 | 5/1971 | Wesp | 428/315 |
| 3,892,899 | 7/1975 | Klein | 428/310 |

FOREIGN PATENT DOCUMENTS

| 375519 | 4/1964 | Switzerland | 428/315 |
|---|---|---|---|
| 1143109 | 2/1969 | United Kingdom | 428/315 |

*Primary Examiner*—William J. Van Balen
*Attorney, Agent, or Firm*—Carella, Bain, Gilfillan & Rhodes

[57] ABSTRACT

A moisture, fungi, and alkaline salt resistant laminate for floor, wall or other covering purposes comprising a moisture permeable backing layer, preferably a sized asbestos felt, a barrier layer overlying the backing layer resistant to penetration and degradation by moisture, fungi and alkaline salts, preferably a thermoplastic resin such as polyvinyl chloride or mixtures of resins having the mentioned characteristics, a resinous body layer overlying the barrier layer preferably of an open cellular character and a resinous wear layer overlying the body layer.

11 Claims, 2 Drawing Figures

RESINOUS MOISTURE RESISTANT LAMINATE

BACKGROUND OF THE INVENTION

Historically, there has been a long felt need in the floor covering arts for a material which could be applied directly to a concrete slab having a high hydrostatic pressure such as frequently encountered below grade. Linoleum, the first nontextile resilient floor covering, developed about 1860, was limited to use on suspended floors because of poor moisture resistance characteristics.

In the early 1920's, asphalt tile was introduced to the marketplace which had improved moisture resistance characteristics over linoleum but nevertheless failed under relatively high hydrostatic pressures commonly found in below-grade concrete slabs. The asphalt tile was sufficiently water penetration resistant that the only avenue of escape for water in wet areas was by seepage or evaporation through the seams between tiles. Ground water saturating the concrete slab in wet areas contained a variety of dissolved salts including alkaline salts leached from the concrete. Evaporation left unsightly salt deposits along the seams and, in time, raised the tiles along the seams. Additionally, because of the non-porous character of asphalt tile, water tended to collect along cracks or holes in the concrete forming a water blister beneath the tile which would be extruded to and upwardly through the seams to lay on the surface and cause delamination of the adhesive bond between the tile and the concrete. Vinyl asbestos and pure vinyl tiles suffered from the same disadvantages as asphalt tile.

In the early 1950's vinyl surfaced resilient floor having an organic felt backing was introduced. The organic felt was not water resistant suffering from dimensional changes due to swelling and fungi degradation. The organic felt backing was replaced with an inorganic asbestos backing in the late 1950's but moisture problems remained including dimensional instability resulting in shrinkage with resultant seam opening and water evaporation through the seams leaving a salt residue.

In the early 1960's cushion vinyl floor covering was introduced having an inorganic, asbestos felt backing, a body layer of vinyl foam and a top, wear layer of vinyl. Nevertheless, such cushion vinyl flooring failed under high moisture conditions.

The asbestos backing in cushion vinyl flooring is porous and therefore adsorbed large quantities of moisture. The vinyl foam body had an open cellular character and is thus also moisture permeable. However, the wear layer is non-porous and hence moisture impervious. As a result, both water and dissolved salts accumulate in the layers beneath the wear layer.

Commonly, a pattern is imprinted with color dyes on top of the intermediate body layer. The dissolved salts, particularly alkaline salts leached from the concrete slab degradated many of the dyes in a relatively short period of time resulting in unsightly, spotty color changes. Additionally, plasticizers employed in the foam layer encouraged the growth of unsightly black fungi in the foam layer and intermediate it and the wear layer. Neither condition can be remedied by other than removal and replacement of the floor covering.

At present, the only available method to prevent these problems is the use of a waterproof membrane beneath the concrete slab which is costly, difficult to properly install and difficult to maintain waterproof. As a result, many contractors either do not install such a membrane or install it improperly with the result that the flooring deteriorates. In warm, moist climates, this deterioration can occur in a matter of weeks to a few months.

It is therefore among the objects and advantages of the present invention to provide a laminate suitable for floor covering on concrete under extremely high hydrostatic conditions which will permit the spread of moisture from extremely wet areas without the development of water blisters yet will not yield to color degradation of dyes on top of a foamed, cushion layer or to the growth of fungi therein.

Another object of the present invention is to provide a laminate of the character aforesaid which is dimensionally stable, and resistant to attack from alkaline and other salts as well as fungi under extreme moisture conditions.

Still another object of the present invention is to provide a laminate as aforesaid which can be installed with seams between adjacent segments sealed against water evaporation by well-known techniques.

Yet a further object of the present invention is to provide a laminate as aforesaid which is suitable for use as a floor, wall or other covering such as upholstry and which can be employed on concrete slabs under extremely high moisture conditions without the use of waterproof membranes beneath the slab.

These objects and advantages as well as other objects and advantages may be achieved by the laminate disclosed herein.

SUMMARY OF THE INVENTION

A resinous, moisture resistant laminate comprising a moisture permeable backing layer which is dimensionally stable and resistant to degradation from water soluble alkaline salts and fungi, a barrier layer overlying the backing layer which is dimensionally stable and substantially impervious to moisture penetration and resistant to degradation from water soluble alkaline salts and fungi, an intermediate open cellular, foamed resinous layer overlying the barrier layer and a resinous wear layer overlying the intermediate layer.

PREFERRED EMBODIMENT OF THE INVENTION

The objects and advantages aforesaid as well as other objects and advantages may be achieved by the laminate disclosed and claimed herein a preferred embodiment of which is illustrated in the drawings in which:

Figure 1:
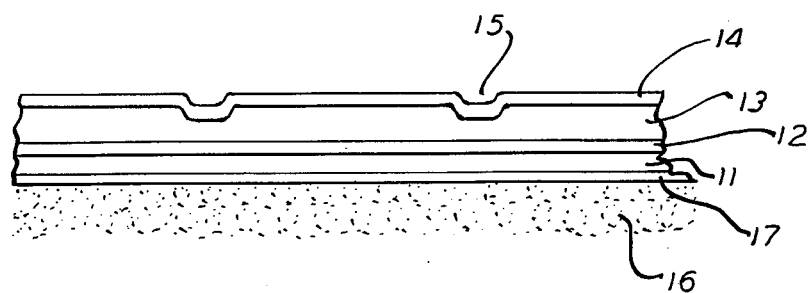
FIG. 1 is a side elevational cross sectional view of a preferred laminate structure.

Cushion vinyl flooring and methods for its manufacturing including embossed or textured cushion vinyl flooring is well known in the arts. Such cushion vinyl flooring and methods for manufacturing the same are disclosed in U.S. Pat. Nos. 3,293,108, 3,293,094 and 3,408,248 which are incorporated herein by reference particularly as they relate to both the structure and methods of manufacture of cushion vinyl flooring both embossed and unembossed and whether or not embossed by chemical or mechanical means.

Broadly, cushion vinyl flooring comprises a backing layer of asbestos felt, an overlying intermediate layer of vinyl foam overlying the backing layer and a top, wear layer of clear vinyl overlying the intermediate layer.

The intermediate layer may be embossed or non-embossed as may the wear layer.

Most commonly, a multi-colored pattern is applied to the top of the intermediate layer. The dyes employed to generate the colored pattern are most commonly inorganic dyes or pigments many of which are subject to degradation by water soluble alkaline salts leached from concrete. The most extreme degradaton has been encountered with respect to chrome yellows and oranges.

Asbestos felt is porous and therefore tends to soak up moisture permitting penetration through the backing layer to the intermediate foamed layer. The foamed vinyl employed in cushion flooring has an open cellular structure and is therefore also moisture permeable. Therefore, water soluble salts, particularly the alkaline salts leached from concrete, penetrate the asbestos backing of such flooring to and through the foamed vinyl intermediate layer to engage the dyes generating the colored pattern on top of the intermediate layer. Color degradation ensues.

Additionally, plasticizers employed in the foamed vinyl intermediate layer encourage the growth of fungi or other bacteria and mold, hereinafter generally referred to as "fungi." Such fungi appears as a black mottled discoloration seen through the transparent vinyl wear layer.

The mere treatment of the asbestos felt backing to render it moisture impervious or the use of water impervious backing is unsatisfactory. Such water impervious backings cause water blisters to form intermediate the floor covering and the concrete. Therefore, it is desirable to maintain a water permeable layer intermediate the concrete floor and any water impermeable layer thereabove so as to insure the distribution of water from saturated areas outwardly thereby preventing the formation of water blisters. Thus, during extremely wet conditions, capillary action in the backing layer immediately adjacent to the concrete spreads the moisture without the formation of water blisters, the moisture retreating back into the concrete during alternate less moist periods.

However, it is necessary to provide a barrier layer intermediate the moisture permeable backing layer and the open cellular foamed vinyl intermediate layer supporting the colored pattern as well as the water impervious clear top wear layer. Such a barrier layer must also be resistant to penetration and degradation by both water soluble salts, particularly alkaline salts, and fungi. Lastly, all layers must be dimensionally stable against either expansion or shrinkage from moisture adsorption or contact with water soluble salts and fungi.

Figure 2:
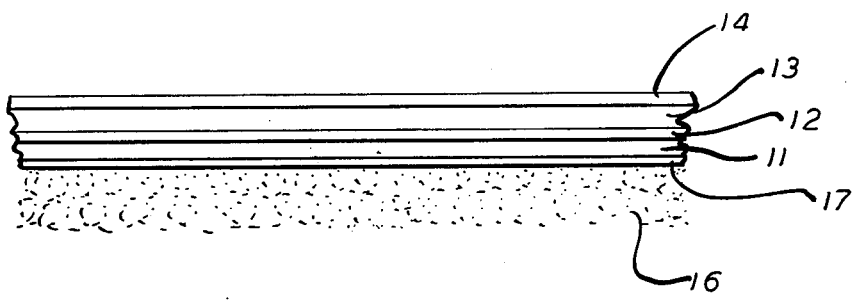
FIG. 2 is a side elevational cross sectional view of an alternate laminate structure.

A laminate exhibiting all of these characteristics is illustrated in FIGS. 1 and 2. Referring specifically to FIG. 1, the laminate comprises a backing layer 11 comprised of water permeable asbestos felt; an overlying barrier layer 12 which is water impermeable, dimensionally stable and resistant to degradation by water soluble salts, particularly alkaline salts and fungi; an intermediate open cellular foamed vinyl layer 13 overlying the barrier layer 12; and a transparent water impervious vinyl wear layer 14 overlying the intermediate layer 13. Both the intermediate foamed vinyl layer 13 and the wear layer 14 are embossed at 15. The laminate is laid upon a concrete slab 16 and adhesed thereto by any suitable mastic 17.

In FIG. 2, an alternate form of laminate is shown in which the numerals refer to the same constituent layers, mastic and concrete slab, the only difference being that no embossed portions are employed.

Asbestos felt backing is well known in the art. It is preferred that a 30 gauge (0.030 inch) asbestos felt be employed. Preferably, a latex seal coat is applied to the asbestos felt as a sizing. The seal coat provides a mechanically tight surface thereby avoiding discontinuities in the barrier coat due to loose projecting fibers in the asbestos felt backing. Latex seal coats suitable for application to asbestos felt backing are well known in the cushion vinyl flooring arts.

While asbestos felt is suitable, any moisture permeable material may be employed which is dimensionally stable under varying moisture conditions, is insoluble in water and resistant to degradation by water soluble salts, particularly alkaline salts and fungi. It must also be sufficiently mechanically strong to be processed in sheets and stable at process temperatures commonly employed to manufacture cushioned vinyl flooring, generally on the order of magnitude of 450° F. An alternative material to asbestos felt is a compacted fiberglass sheet.

The barrier layer must be chemically and mechanically compatible with both the backing layer and the foamed vinyl cushion layer. Additionally, the barrier layer must be substantially moisture impervious, dimensionally stable under varying moisture conditions, and resistant to degradation by water soluble salts, particularly alkaline salts, and fungi. A suitable barrier layer consists essentially of a polyvinyl chloride resin which may be applied to continuous sheets of the asbestos felt backing as a dispersion. A suitable barrier layer dispersion comprises polyvinyl chloride resin, a compatible plasticizer, a heat and light stabilizer and a fungicide.

Suitable dispersions for the intermediate foam layer as well as suitable dispersions for the wear layer are well known in the art of cushion vinyl flooring and need not be detailed further. Such dispersions and procedures for their application to form cushion vinyl laminates are described in the aforementioned patents.

A suitable laminate in accordance with the present invention may be prepared by applying the latex seal coat to the asbestos felt and heating to dry and set. Thereafter, the barrier coat dispersion is applied to the latex treated asbestos felt. Preferably, the barrier dispersion is applied to achieve a thickness of approximately 20 gauge (0.020 inches) and passed through an oven at approximately 345° to set.

Thereafter, the pre-gel dispersion which ultimately is heated to form the foamed intermediate layer is applied to the barrier layer. After application of the pre-gel, the sheet is run through a drying oven at approximately 330° F. which is beneath the critical blowing temperature to form the foamedopen cellular structure. Nevertheless, the pre-gel is thereafter set and a printed pattern may be applied thereto. After printing a pattern onto the pre-gel layer, the wear layer is applied as a dispersion and the sheet then passed through an oven at a temperature sufficient to cause blowing of the pre-gel layer to produce the foamed-open cellular structure. Temperatures on the order of magnitude of 400°–435° F. are employed.

There is thus formed a laminate which includes a moisture barrier layer intermediate the backing layer and the foamed open cellular vinyl intermediate layer.

The thickness of the pre-gel layer and ultimately the foamed layer produced therefrom as well as the thickness of the wear layer is a matter of choice.

It will be understood by those skilled in the art that many modifications and variations of the present invention may be made without departing from the spirit and the scope thereof.

What is claimed is:

1. A resinous, moisture resistant laminate comprising:
   (a) a moisture permeable backing layer which is dimensionally stable under varying moisture conditions and resistant to degradation from water;
   (b) a barrier layer overlying the backing layer which is dimensionally stable under varying moisture conditions and substantially impervious to moisture penetration;
   (c) an intermediate, open-cellular, foamed resinous layer overlying the barrier layer; and
   (d) a resinous wear layer overlying the intermediate layer.

2. A resinous, moisture resistant laminate comprising the structure in accordance with claim 1 in which
   (a) the backing layer is resistant to degradation from water soluble alkaline salts.

3. A resinous, moisture resistant laminate comprising the structure in accordance with claim 1 in which
   (a) the backing layer is resistant to degradation from fungi.

4. A resinous, moisture resistant laminate comprising the structure in accordance with claim 1 in which
   (a) the barrier layer is resistant to degradation from water soluble alkaline salts.

5. A resinous, moisture resistant laminate comprising the structure in accordance with claim 1 in which
   (a) the barrier layer is resistant to degradation from fungi.

6. A resinous, moisture resistant laminate comprising the structure in accordance with claim 1 in which
   (a) the barrier layer is substantially impervious to penetration by and degradation from water soluble alkaline salts.

7. A resinous, moisture resistant laminate comprising the structure in accordance with claim 1 in which
   (a) the barrier layer is substantially impervious to penetration by and resistant to degradation from fungi.

8. A resinous, moisture resistant laminate comprising the structure in accordance with claim 1 in which:
   (a) the backing layer is substantially resistant to degradation from water, alkaline salts and fungi; and
   (b) the barrier layer is substantially impervious to penetration by and resistant to degradation from moisture, water soluble alkaline salts and fungi.

9. A resinous, moisture resistant laminate comprising the structure in accordance with claim 8 in which the barrier layer consists essentially of polyvinyl chloride.

10. A resinous, moisture resistant laminate comprising the structure in accordance with claim 9 in which
    (a) the backing layer is asbestos felt.

11. A resinous, moisture resistant laminate comprising the structure in accordance with claim 9 in which
    (a) the backing layer is a fiberglass mat.

* * * * *